United States Patent
Okamoto et al.

(10) Patent No.: US 8,107,185 B2
(45) Date of Patent: Jan. 31, 2012

(54) MAGNETIC DISK DEVICE INCLUDING A SENSOR IN A CASE

(75) Inventors: Kazuhiro Okamoto, Niigata-Ken (JP); Yuki Ono, Niigata-Ken (JP); Yukihiro Gorai, Niigata-Ken (JP); Mitsuru Watanabe, Niigata-Ken (JP); Akihiro Sato, Niigata-Ken (JP); Keitaro Kikuchi, Niigata-Ken (JP)

(73) Assignee: Alps Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/562,742

(22) Filed: Sep. 18, 2009

(65) Prior Publication Data

US 2010/0079913 A1    Apr. 1, 2010

(30) Foreign Application Priority Data

Sep. 30, 2008  (JP) .................................. 2008-253573

(51) Int. Cl.
  *G11B 21/02*  (2006.01)
  *G11B 5/48*  (2006.01)

(52) U.S. Cl. ...................................... 360/75; 360/244.1

(58) Field of Classification Search .......................... None
  See application file for complete search history.

(56) References Cited

U.S. PATENT DOCUMENTS 7,188,530 B2 *  3/2007  Pedersen et al. ................ 73/718
7,630,160 B2    12/2009  Kurita et al.

FOREIGN PATENT DOCUMENTS

| JP | 62-88345 | 4/1987 |
|---|---|---|
| JP | 63-273287 | 11/1988 |
| JP | 09-063220 | 3/1997 |
| JP | 2006-295001 | 10/2006 |
| JP | 2006-295011 | 10/2006 |
| JP | 2007-234640 | 9/2007 |
| JP | 2008-165949 | 7/2008 |

OTHER PUBLICATIONS

Office Action issued in corresponding Japanese Patent Application No. 2008-253573; mailed Jul. 27, 2010.

* cited by examiner

*Primary Examiner* — Andrew L Sniezek
(74) *Attorney, Agent, or Firm* — Brinks Hofer Gilson & Lione

(57) ABSTRACT

A magnetic disk device includes a magnetic head assembly, which includes magnetic heads, support plates, and a flexible wiring substrate that are integrally formed. The magnetic heads include heating elements for making head element parts protrude toward magnetic disks by thermal expansion, the support plate supports the magnetic head, the flexible wiring substrate is provided along the support plate and electrically connects the magnetic heads to a circuit system, and the magnetic head assembly and the magnetic disks are assembled in a case. The magnetic disk device includes a sensor and a floating distance control circuit. The sensor detects at least one of atmospheric pressure, temperature, and humidity in the case. The floating distance control circuit increases or decreases current supplied to the heating element on the basis of the output of the sensor and controls the floating distance of the magnetic head so that the floating distance is constant. While being received in a package made of high temperature co-fired ceramic, the sensor is mounted on a circuit mounting surface of the flexible wiring substrate in the case.

2 Claims, 6 Drawing Sheets

MAGNETIC DISK DEVICE INCLUDING A SENSOR IN A CASE

CROSS REFERENCE TO RELATED APPLICATION

The present invention contains subject matter related to and claims priority to Japanese Patent Application No. 2008-253573 filed in the Japanese Patent Office on Sep. 30, 2008, the entire contents of which being incorporated herein by reference.

BACKGROUND

1. Technical Field

The present disclosure relates to a magnetic disk device that includes a floating magnetic head including a heating element for making a head element part protrude toward a magnetic disk by thermal expansion and controls a floating distance of the head by increasing or decreasing current supplied to the heating element.

2. Related Art

In a magnetic disk device including a floating magnetic head assembly, a magnetic disk and a magnetic head assembly are assembled in a case, and a head floating distance has been further decreased as the recording density has been increased in recent years. However, a head floating distance varies depending on the change in atmospheric pressure. If a head floating distance is excessively decreased, there is a concern that the magnetic head and the magnetic disk come into contact with each other. In contrast, if a head floating distance is excessively increased, there is a concern that the performance of the head deteriorates and writing/reproducing errors occur. A method, which adjusts a head floating distance in accordance with the change in atmospheric pressure, has been proposed in recent years in order to avoid these problems. For example, a magnetic disk device, which includes an atmospheric pressure sensor which detects the atmospheric pressure and stabilizes a head floating distance by changing the load of a magnetic head in accordance with the change in atmospheric pressure, has been disclosed in Japanese Unexamined Patent Application Publication Nos. 63-273287 and 09-063220.

In the magnetic disk device including the atmospheric pressure sensor, there has been a demand for improved accuracy of the control of the head floating distance that is achieved by making the atmospheric pressure sensor be received in a case. However, the demand has not been achieved at present due to the problem of cleanliness. The specific position of the atmospheric pressure sensor has not been described in Japanese Unexamined Patent Application Publication No. 63-273287. In Japanese Unexamined Patent Application Publication No. 09-063220, an atmospheric pressure sensor is mounted on the outer wall of a head disk assembly.

SUMMARY

According to an aspect of the disclosure, there is provided a magnetic disk device including a magnetic head assembly. The magnetic head assembly includes magnetic heads, support plates, and a flexible wiring substrate that are integrally formed. The magnetic heads include heating elements that make head element parts protrude toward magnetic disks by thermal expansion. The support plate supports the magnetic head. The flexible wiring substrate is provided along the support plate and electrically connecting the magnetic heads to a circuit system, and the magnetic head assembly and the magnetic disks are assembled in a case. The magnetic disk device includes a sensor and a floating distance control circuit. The sensor detects at least one of atmospheric pressure, temperature, and humidity in the case. The floating distance control circuit increases or decreases current supplied to the heating element on the basis of the output of the sensor and controls the floating distance of the magnetic head so that the floating distance is constant. While being received in a package made of a high temperature co-fired ceramic, the sensor is mounted on a circuit mounting surface of the flexible wiring substrate in the case. The sensor may be formed by making an atmospheric pressure sensor, a temperature sensor, and a humidity sensor be received in the same package. Furthermore, the sensor and a preamplifier, which controls the writing and reproducing operations of the magnetic head, are mounted on the same circuit mounting surface. If the sensor is a single atmospheric pressure sensor, the atmospheric pressure sensor may be formed of a wafer level chip size package.

DESCRIPTION OF EXEMPLARY EMBODIMENTS

Figure 1:
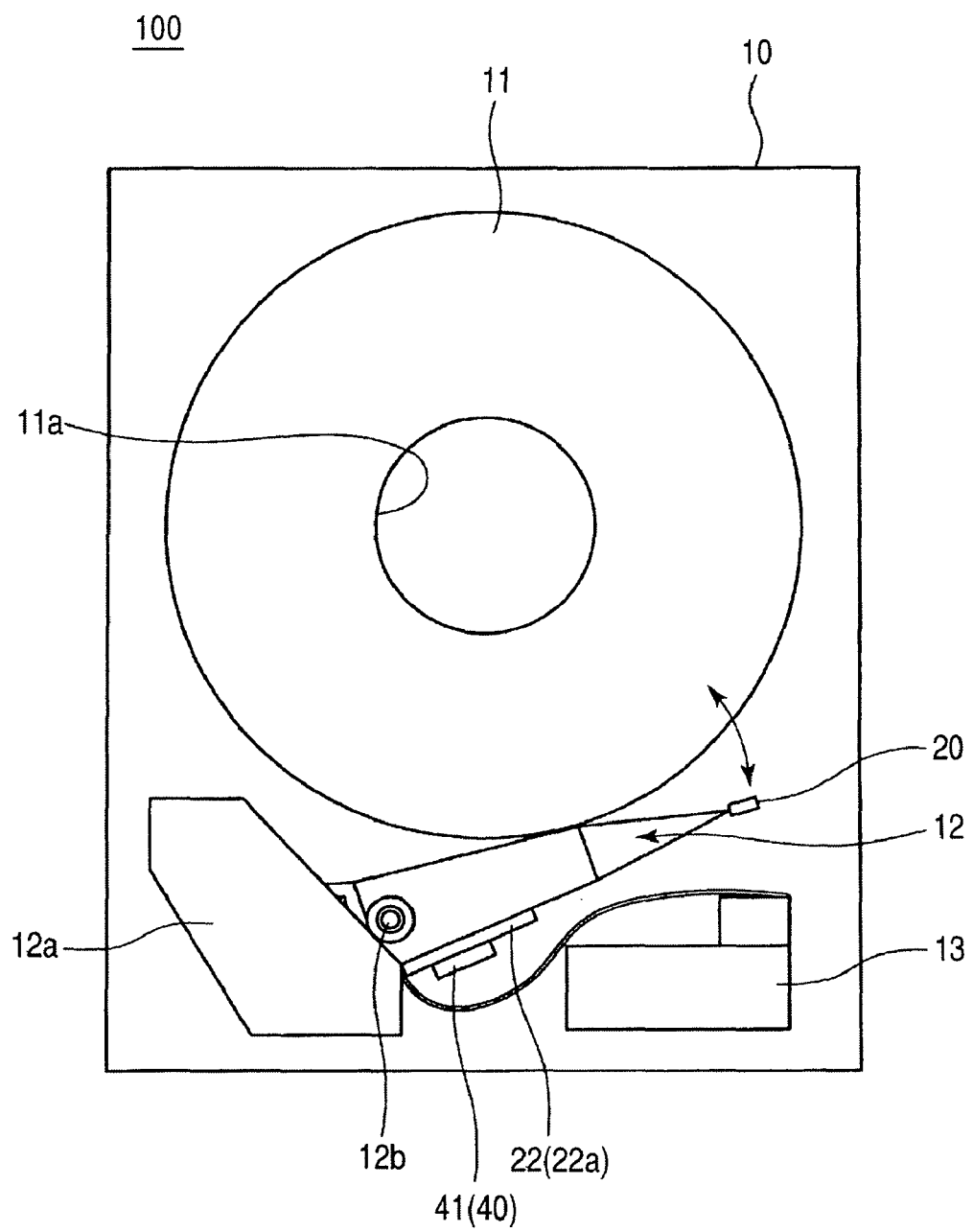
FIG. 1 is a plan view showing the entire configuration of a magnetic disk device according to an embodiment of the disclosure.

FIG. 1 shows the entire configuration of a magnetic disk device 100 according to an embodiment of the disclosure. The magnetic disk device 100 includes a magnetic disk 11, a magnetic head assembly (HGA) 12, and a control circuit system 13 that are assembled in a case 10. The magnetic disk 11 is driven to rotate about a rotating shaft 11a, and the magnetic head assembly (HGA) 12 is supported so as to freely swing about a rotating shaft 12b provided at a base end thereof. When the magnetic head assembly 12 swings about the rotating shaft 12b by an actuator 12a, a free end of the magnetic head assembly 12 reciprocates in a radial direction of the magnetic disk 11.

Figure 2:
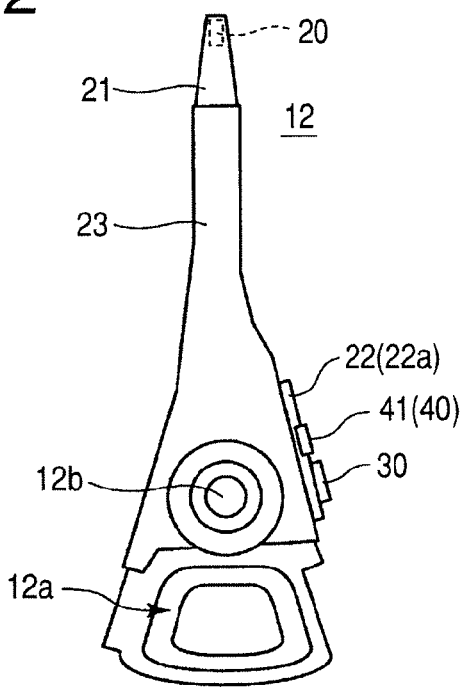
FIG. 2 is a top view showing the configuration of a magnetic head assembly.
Figure 3:
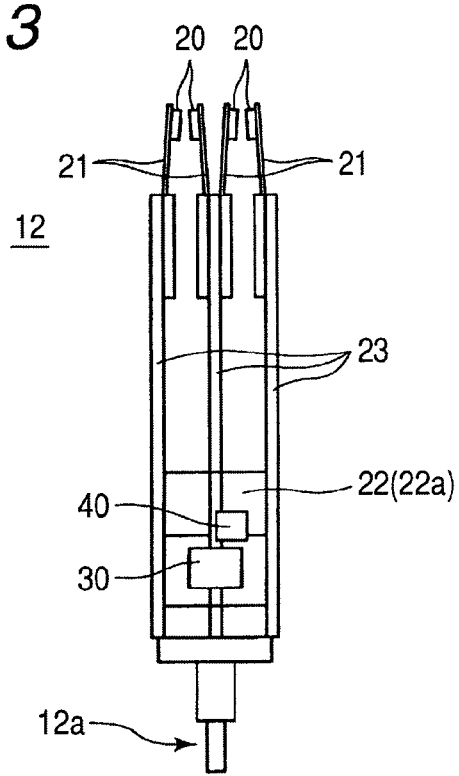
FIG. 3 is a side view showing the configuration of the magnetic head assembly.

FIG. 2 is a top view showing the configuration of the magnetic head assembly 12, and FIG. 3 is a side view showing the configuration of the magnetic head assembly. The magnetic head assembly 12 is a floating magnetic head assembly that floats by an air flow generated on the surface of the magnetic disk while the magnetic disk is rotationally driven, and records/reproduces magnetic information on/from the magnetic disk 11 while floating. Magnetic heads 20 are provided at the free end of the magnetic head assembly. Suspensions 21 of the magnetic head assembly 12, which support the magnetic heads 20, are each formed of a flexible thin metal plate, and a flexible wiring substrate 22 is fixedly attached to the surface of the suspensions 21 by an adhesive.

Although not shown in detail, for example, the magnetic head 20 includes a heating element that makes a head element part, which records and reproduces the magnetic information by a giant magnetoresistance effect, protrude toward the magnetic disk 11 by thermal expansion. It is known that the heating element may be made of a resistant material, such as NiFe, CuNi, or CuMn, and provided at an upper or lower portion of the head element part or at an inner position as compared to the head element part in a height direction of the element.

The suspension 21 is mounted on the end of a load beam 23 so that the magnetic head 20 is elastically supported with respect to the load beam 23. The rotating shaft 12b of the magnetic head assembly 12 is provided at the load beam 23. Two magnetic disks 11 are provided in this embodiment. The suspensions 21 are mounted on the load beams 23 so that a pair of magnetic heads 20 faces each other to be capable of simultaneously recording/reproducing the magnetic information on/from the front and back surfaces of each of the magnetic disks 11. That is, two pairs of the suspensions 21, which make the magnetic heads 20 face each other, are mounted on laminated three load beams 23. The number of each of the magnetic disks 11, the magnetic heads 20, the suspensions 21, and the load beams 23 is arbitrary.

The flexible wiring substrate 22 includes branching terminals that are electrically connected to the magnetic heads 20 disposed at the ends of the suspensions 21. The flexible wiring substrate extends from the terminals along the upper surface of each of the suspensions 21, is further drawn from the rear edges of the suspensions 21, and is put together through a circuit mounting surface 22a that is bent along the side surface from the upper surface of the suspension 21. A preamplifier 30, which controls the recording and reproducing operations of the magnetic head 20, is mounted on the circuit mounting surface 22a. The preamplifier 30 forms a part of a floating distance control circuit that controls the floating distance (head floating distance) of the magnetic head 20.

The control circuit system 13 is a circuit system that controls the entire operation of the magnetic disk device 100, such as the drive of the magnetic disk 11 and the drive of the actuator 12a. The control circuit system is electrically connected to the magnetic head assembly 12 through the flexible wiring substrate 22 (circuit mounting surface 22a).

A sensor 41, which is received in a HTCC package 40 made of HTCC (high temperature co-fired ceramic), is further provided in the case 10 of the magnetic disk device 100 having the above-mentioned configuration. More specifically, the HTCC package 40 is mounted on the circuit mounting surface 22a of the flexible wiring substrate 22 together with the preamplifier 30, and is provided on the side surface of the magnetic head assembly 12.

The HTCC package 40 is formed by firing a ceramic material, which contains alumina as a principal ingredient, at a high temperature of about 1600° C. Even though being provided in the case 10, the HTCC package does not cause contaminations. Since the dust or dirt, which is attached in a package manufacturing process, is sublimated in the high temperature firing, the high level of cleanliness is obtained from a completed product.

Figure 4:
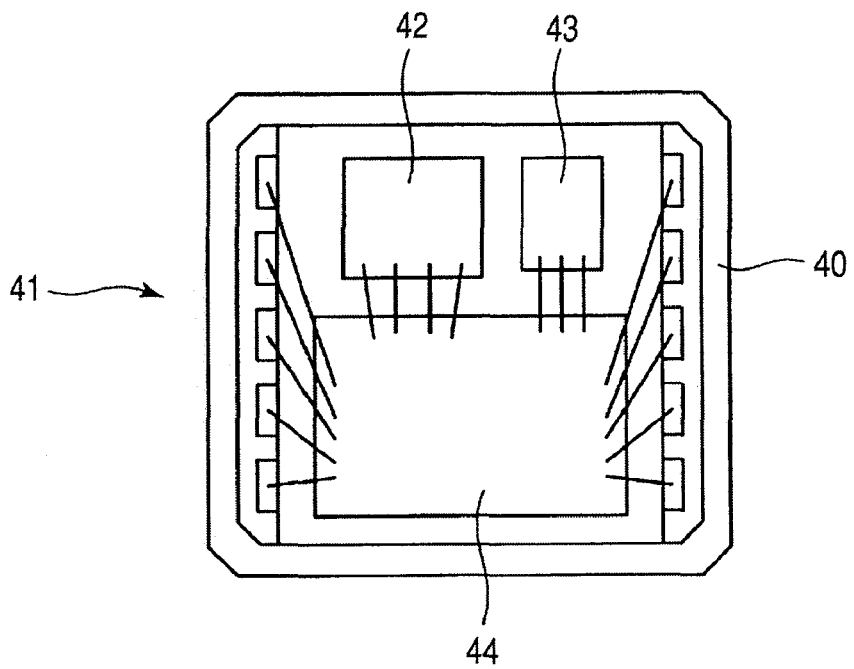
FIG. 4 is a plan view showing the configuration of a sensor element.
Figure 5:
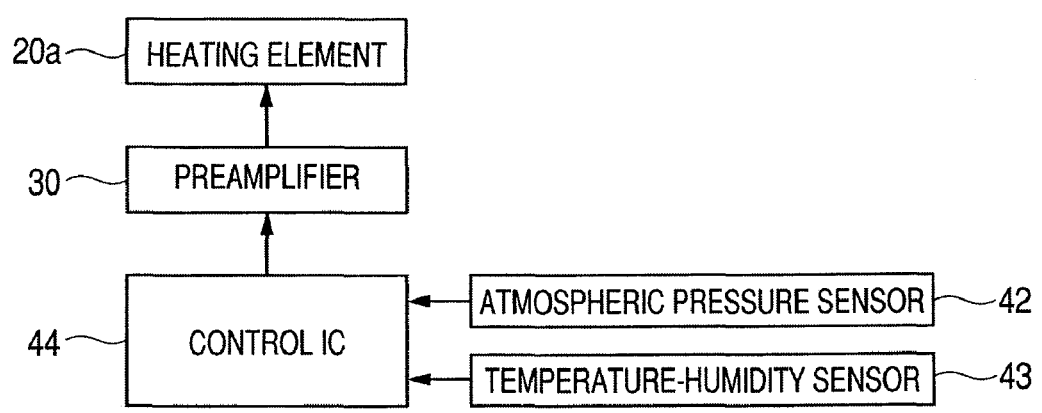
FIG. 5 is a block diagram of a floating distance control system.

FIG. 4 shows the configuration of the sensor 41, and FIG. 5 shows a head floating distance control system. The sensor 41 includes an atmospheric pressure sensor 42, a temperature-humidity sensor 43, and a control IC 44 that are provided on the same substrate. The atmospheric pressure sensor detects atmospheric pressure in the case 10, and the temperature-humidity sensor detects the temperature and humidity in the case 10.

A force in a floating direction, which is applied to the magnetic head 20 by the air flow generated by the magnetic disk 11 rotationally driven during the recording and reproducing operations, varies depending on the changes in the atmospheric pressure, the temperature, and the humidity of the environment where the magnetic disk device 100 is used. That is, if the atmospheric pressure rises, the head floating distance is increased. In contrast, if the atmospheric pressure falls, the head floating distance is decreased. Further, the head floating distance tends to be increased if the temperature rises, and the head floating distance tends to be decreased if the temperature falls. The head floating distance tends to be decreased if the humidity rises, and the head floating distance tends to be increased if the humidity falls.

The control IC 44 detects the change of the atmospheric pressure in the case from the output of the atmospheric pressure sensor 42, detects the changes of the temperature and humidity in the case from the output of the temperature-humidity sensor 43, and sends output signals, which correspond to the outputs of the respective sensors, to the preamplifier 30. The preamplifier 30 increases or decreases the current, which is supplied to the heating element of the magnetic head 20, on the basis of the output signal of the control IC 44. Specifically, if the atmospheric pressure rises, if the temperature rises, and if the humidity falls, the current supplied to the heating element 20a is increased. Accordingly, the magnetic head 20 (head element part) further protrudes toward the magnetic disk 11 by thermal expansion, and the head floating distance is decreased. In contrast, if the atmospheric pressure falls, if the temperature falls, and if the humidity rises, the current supplied to the heating element 20a is decreased. Accordingly, a protruding distance of the magnetic head 20 (head element part), which protrudes toward the magnetic disk 11 by thermal expansion, is decreased, and the head floating distance is increased. Therefore, even though the atmospheric pressure, temperature, and humidity are changed in the case 10, the head floating distance is maintained substantially constant. In this embodiment, the head floating distance control circuit is composed of the control IC 44 and the preamplifier 30.

The cleanliness of the HTCC package 40 and a LTCC package, which is made of a low temperature co-fired ceramic, will be evaluated and examined and the results thereof will be described below. The HTCC package 40 (example) and the LTCC package (comparative example), which were used as objects to be examined, had the same surface area (25 mm$^2$). Accordingly, the HTCC package and the LTCC package were evaluated substantially under a condition where only the materials of the packages were different from each other.

Table 1 shows the outgas analysis results. The outgas analysis results were obtained by measuring outgas, which was generated from the samples (HTCC package 40 and LTCC package) by heating, with a gas chromatograph-mass spectrometer (GC-MS). The analysis conditions of Table 1 were as follows:

The number of samples: n=5
Split ratio=10:01:00
Flow rate of purge and trapped gas: 70 mL
Gas chromatograph temperature: 40 to 300° C., β=10° C./min
External standard: 200 ng of Decane was diluted with IPA (isopropyl alcohol), and the injected amount was 1 µL.

TABLE 1

| Criteria |
| --- |
| SN Compound |
| Phthalate Compound |

As apparent from Table 1, outgas ingredients (contaminations) were not detected from both the HTCC package 40 and the LTCC package.

Table 2 shows the out ion analysis results. The out ion analysis results were obtained by extracting liquid from the samples (HTCC package 40 and LTCC package) by using pure water, and measuring various ions of the extracted liquid. The analysis conditions of Table 2 were as follows:

N=25 pcs
Extraction method: DIP (pure water dipping)
Extraction temperature: 80° C.
Extraction time: 60 min

TABLE 2

| Criteria (HGA) |
| --- |

As apparent from Table 2, the LTCC package generated a large number of ion contaminations, but the HTCC package 40 generated a small number of ion contaminations. The reason why a large number of ion contaminations were generated from the LTCC package is considered as follows: since glass is used for the connection in the LTCC package, the ion impurities contained in the glass causes the ion contaminations.

Table 3 shows measurement results. The measurement results were obtained by extracting liquid from the samples (HTCC package 40 and LTCC package) by using an organic solvent, and measuring the nonvolatile residues (NVB) in the extracted liquid. The analysis conditions of Table 3 were as follows:

The number of samples: n=25
Used solvent: n-hexane
Extraction method: DIP (dipping)
Extraction temperature: normal temperature
Extraction time: 5 min

TABLE 3

| Criteria (HGA) |
| --- |

As apparent from Table 3, the amount of nonvolatile residues detected from the HTCC package 40 and the LTCC package are small.

Figure 6:
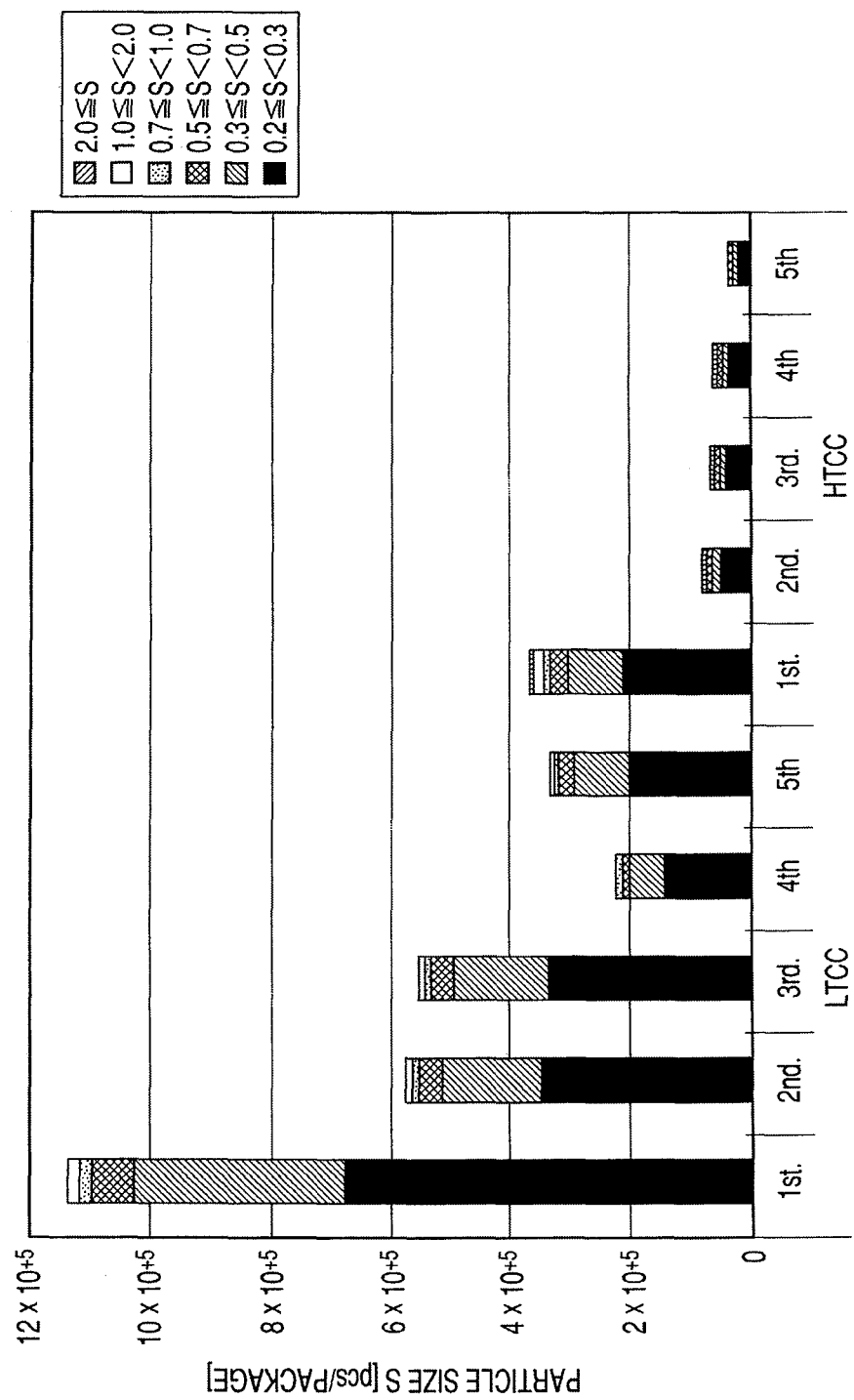
FIG. 6 is a bar graph showing the LPC analysis results.

FIG. 6 shows a bar graph showing LPC analysis results. The LPC analysis results were obtained by extracting liquid from the samples (HTCC package 40 and LTCC package) by an ultrasonic extraction method and measuring particles in the extracted liquid by a liquid particle counter (LPC). The analysis conditions of FIG. 6 were as follows:

The number of samples: n=2 (measurement was performed five times for each sample)
Applied ultrasonic vibration: 68 kHz, 330 W
Extraction time: 1 min As apparent from FIG. 6, the number of particles in the extracted liquid of the HTCC package 40 was significantly smaller than that of the LTCC package, and the particle size of the HTCC package was also smaller than that of the LTCC package.

According to the above-mentioned results (Tables 1 to 3 and FIG. 6), it was apparent that the HTCC package 40 hardly generated outgas even when heated, and had a small amount of ion contaminations, nonvolatile residues, the LPC amount (the number of particles in the liquid), and a high level of cleanliness.

Accordingly, if the sensor 41 is provided in the case 10 by using the HTCC package 40, it may be possible to maintain the high level of cleanliness in the case 10, to accurately detect the changes of the atmospheric pressure, temperature, and humidity in the case 10 by the sensor 41, and to control the head floating distance in accordance with these environmental changes.

The sensor 41 of which the atmospheric pressure sensor 42, the temperature-humidity sensor 43, and the control IC 44 are received in the same HTCC package 40 has been provided above. However, an atmospheric pressure sensor, a temperature sensor, a humidity sensor, and a control IC may be separately received in HTCC packages 40. Alternatively, one or more of the atmospheric pressure sensor, the temperature sensor, and the humidity sensor may be provided. Furthermore, in this embodiment, the current supplied to the heating element has been controlled on the basis of all sensor outputs. However, the current may be controlled on the basis of an output selected from the outputs of the atmospheric pressure sensor and the temperature-humidity sensor.

Figure 7:
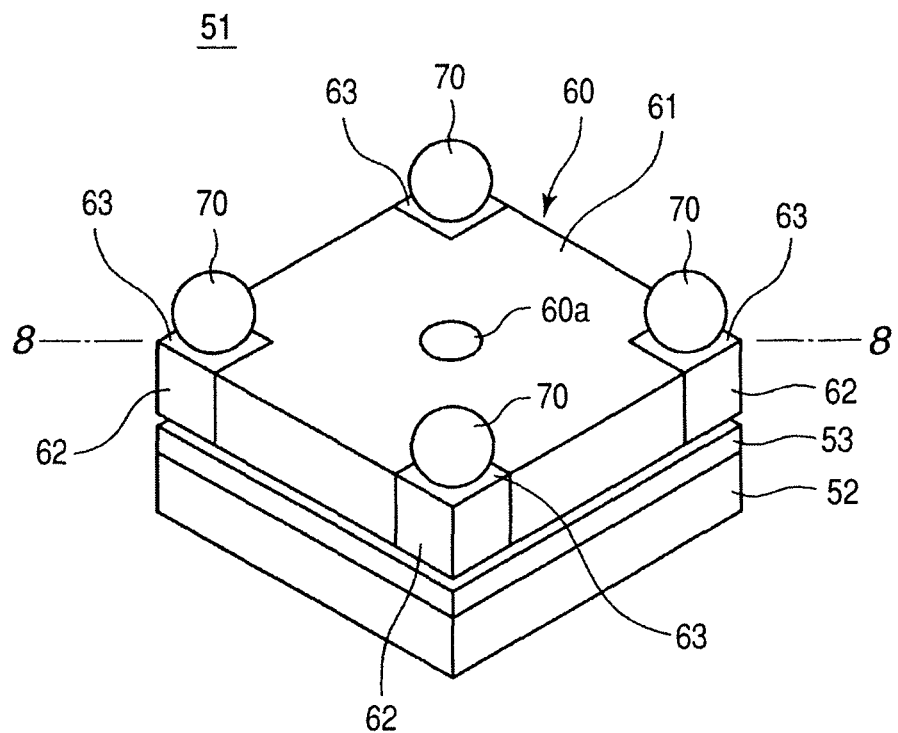
FIG. 7 is a perspective view showing an atmospheric pressure sensor that is formed of a wafer level chip size package.
Figure 8:
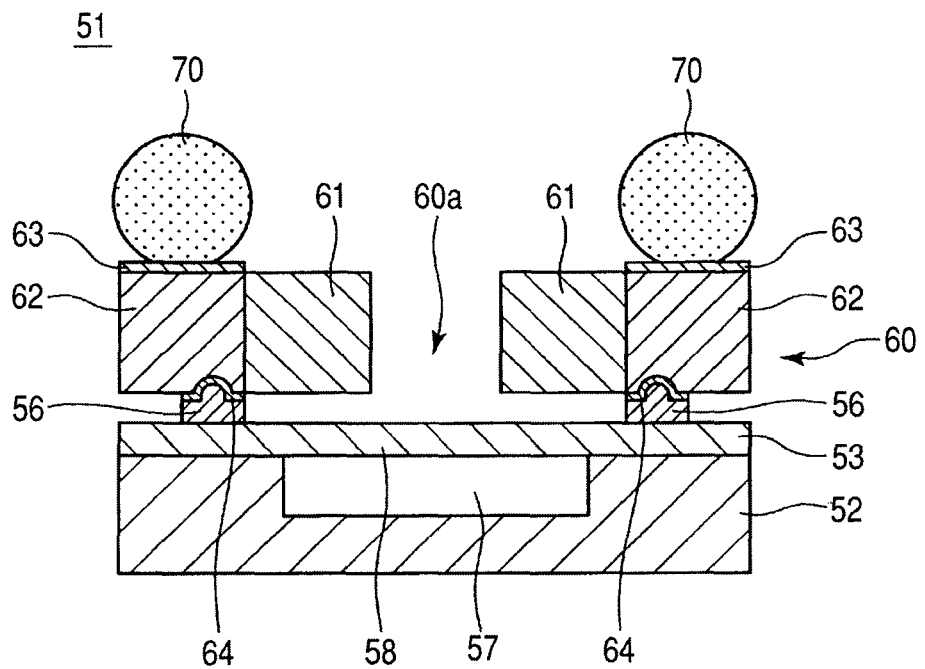
FIG. 8 is a cross-sectional view taken along a line A-A of FIG. 7.
Figure 9:
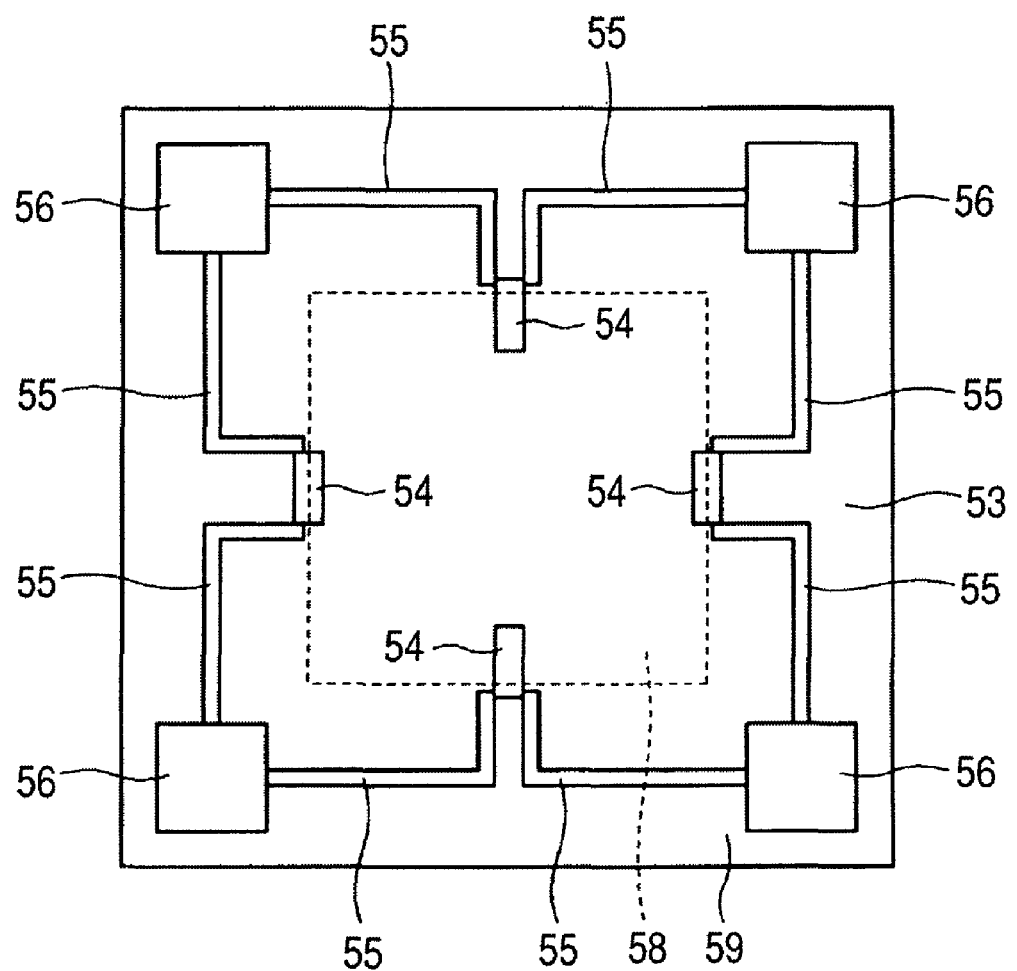
FIG. 9 is a plan view showing the surface of a second silicon substrate of the atmospheric pressure sensor.

FIGS. 7 to 9 show a sensor according to another embodiment that is provided instead of the sensor 41 received in the HTCC package 40. A sensor 51 is an atmospheric pressure sensor that detects the atmospheric pressure in a case 10, and is a wafer level chip size package product that is formed by packaging a wafer as it is.

As shown in FIG. 8, the atmospheric pressure sensor 51 is formed by bonding a first silicon substrate 52 to a second silicon substrate 53. A cavity (recess) 57 is formed at a portion of the first silicon substrate 52, and a diaphragm 58 is formed by the second silicon substrate 53 that is positioned on the cavity 57. As another aspect, a cavity is formed at a portion of the second silicon substrate 53, and a diaphragm may be formed by the first silicon substrate 52 that is positioned below the cavity. As shown in FIG. 9, the cavity 57 and the diaphragm 58 are positioned substantially at the center of the atmospheric pressure sensor 51 in plan view, and have a substantially rectangular shape in plan view. The periphery of the diaphragm 58 is a fixed region 59 that is not deformed even though pressure is applied to the second silicon substrate 53. Piezoelectric elements 54 that are positioned substantially in the middle of respective sides of an outline of the diaphragm 58, and wiring parts 55 and electrode pads that are electrically connected to the respective piezoelectric elements 54 are formed on the surface of the second silicon substrate 53. A silicon substrate has been used in this embodiment, but an SOI substrate, which is formed by bonding a silicon substrate to a silicon substrate with a silicon oxide film interposed therebetween, may be used.

Further, as shown in FIG. 7, an interposer 60, which includes a support substrate 61 and conduction parts 62, is provided above the second silicon substrate 53. A through hole 60a, which passes through upper and lower surfaces of the interposer, is formed substantially at the center of the interposer 60. The support substrate 61 is made of glass, and the conduction part 62 is made of silicon that has conductivity and a low level of resistance. The conduction parts 62 are formed in recesses that are formed at the four corners of the support substrate 61, and a part of each of the conduction parts is exposed to the outside. An external electrode pad 63 is formed on each of the conduction parts 62. The external electrode pads 63 and the piezoelectric elements 54 are electrically connected to each other through the conduction parts 62 and bonding parts 64. The atmospheric pressure sensor 51 is mounted on a circuit mounting surface 22a of a flexible wiring substrate 22, which is provided in the case 10, through bonding balls 70 such as solder provided on the external electrode pads 63. The conduction part 62 may be made of metal.

As described above, the atmospheric pressure sensor 51 is a wafer level chip size package that is formed by rewiring a wafer, forming terminals on the wafer, and separating the wafer into several pieces. Accordingly, there is no necessity to consider outgas caused by an external package member or dirt during the mounting, ion contaminations, nonvolatile residues, and the LPC amount (the number of particles in the liquid). Accordingly, if the atmospheric pressure sensor 51 is formed of a wafer level chip size package, it may be possible to secure a high level of cleanliness. Therefore, even though being provided in the case 10, it may be possible to maintain the high level of cleanliness in the case 10. Meanwhile, the support substrate 61 has been provided to mount the atmospheric pressure sensor in this embodiment. However, instead of the bonding balls 70, electrode pads 56 may be provided on the second silicon substrate 53 so that the atmospheric pressure sensor is directly bonded without the interposer 60.

It should be understood by those skilled in the art that various modifications, combinations, sub-combinations and alterations may occur depending on design requirements and other factors insofar as they are within the scope of the appended claims of the equivalents thereof.

What is claimed is:

1. A magnetic disk device including a magnetic head assembly, the magnetic head assembly including magnetic heads, support plates, and a flexible wiring substrate that are integrally formed, the magnetic heads including heating elements for making head element parts protrude toward magnetic disks by thermal expansion, the support plate supporting the magnetic head, the flexible wiring substrate being provided along the support plate and electrically connecting the magnetic heads to a circuit system, and the magnetic head assembly and the magnetic disks being assembled in a case, the magnetic disk device comprising:

a sensor that detects at least one of atmospheric pressure, temperature, and humidity in the case;

a preamplifier; and a floating distance control circuit that increases or decreases the current supplied to the heating element on the basis of the output of the sensor and controls the floating distance of the magnetic head so that the floating distance is constant, wherein the sensor is received in a package made of a high temperature co-fired ceramic, and the sensor and the preamplifier are mounted on a circuit mounting surface of the flexible wiring substrate in the case and the preamplifier is a separate member from the package.

2. The magnetic disk device according to claim 1,
   wherein the sensor comprises an atmospheric pressure sensor, a temperature sensor, and a humidity sensor received in the package.

* * * * *